Aug. 6, 1963

H. P. LEMAIRE ET AL

METHODS FOR OBTAINING FILMS OF MAGNETIC SPINEL CRYSTALS ON SUBSTRATES 3,100,158

Filed Nov. 2, 1960

2 Sheets-Sheet 1

INVENTORS
HENRY P. LEMAIRE &
BY WILLIAM J. CROFT
W.S. Hill
AGENT

INVENTORS
HENRY P. LEMAIRE &
BY WILLIAM J. CROFT
W.S. Hill
AGENT

United States Patent Office 3,100,158

Patented Aug. 6, 1963

3,100,158

METHODS FOR OBTAINING FILMS OF MAGNETIC SPINEL CRYSTALS ON SUBSTRATES

Henry P. Lemaire and William J. Croft, Natick, Mass., assignors to Radio Corporation of America, a corporation of Delaware Filed Nov. 2, 1960, Ser. No. 66,826
12 Claims. (Cl. 117—49)

Figures 1, 2, 3:
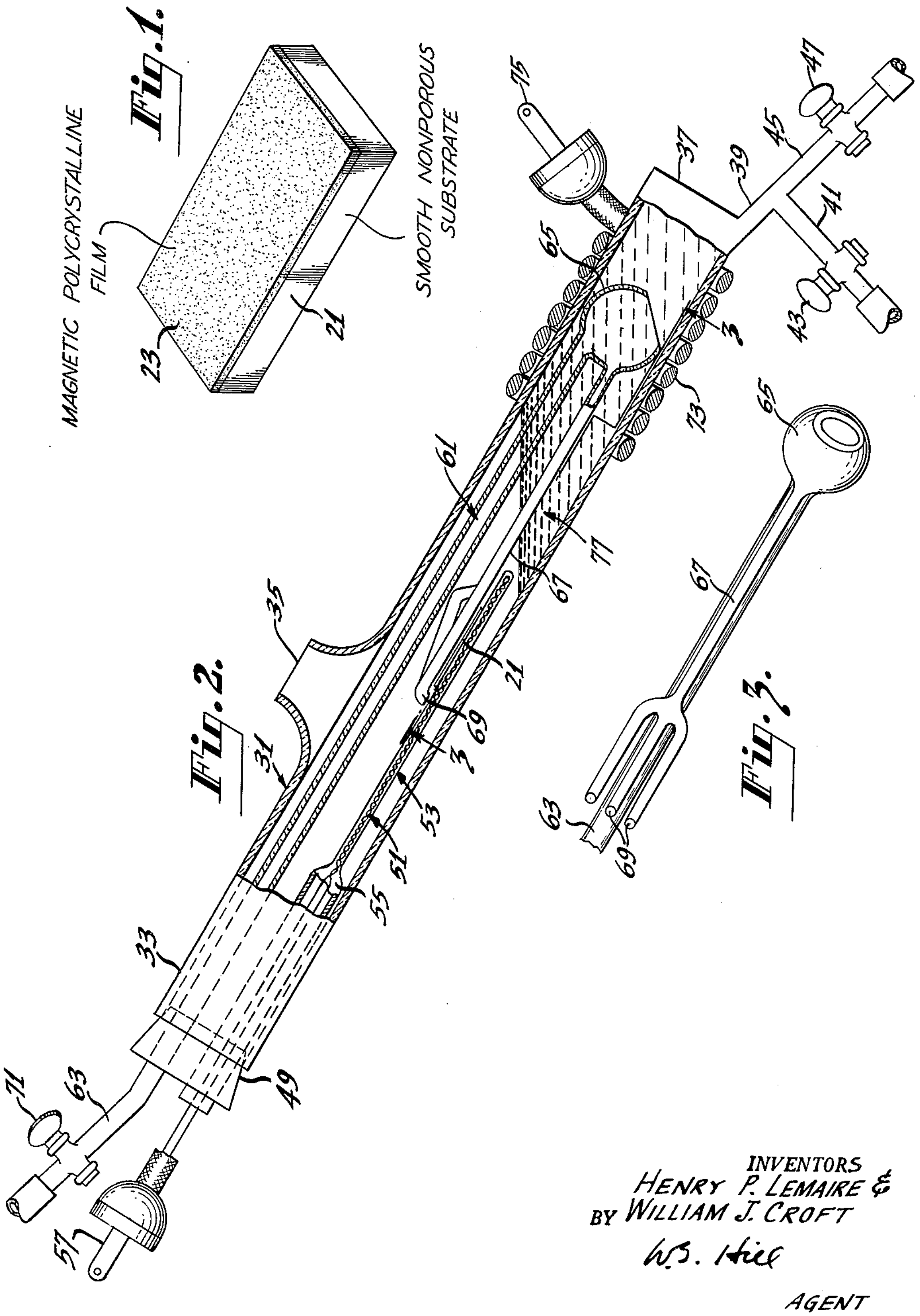

This invention relates to continuous films of crystals having a spinel structure and to methods of preparation thereof.

Recent interest in magnetic relaxation phenomena, particularly as applicable in digital computer memory systems, has led to interest in the properties of magnetic materials in the form of thin continuous films. Continuous films of crystals are to be distinguished from films of discrete particles which are separated from each other by another material, usually a film-forming binder. As used herein, continuous films refers to one or more crystals in a thin layer on a support. Where more than one crystal is present, the crystals abut upon one another with no other material separating the abutting crystals. Emphasis has been on continuous metal films, either pure metals or alloys, where a variety of methods for depositing the films have been used. These methods include vacuum deposition, electrochemical deposition, and chemical reduction. Difficulties exist in all previous methods due to a lack of process control, lack of reproducibility, variation in composition, and similar disabilities.

An object of this invention is to provide improved continuous films, particularly magnetic films, of crystals having a spinel structure.

Another object is to provide novel methods for preparing continuous films of ferrite crystals having a spinel structure.

A further object is to provide methods for preparing continuous films of spinel crystals, which methods avoid many of the difficulties of previous techniques and in which the thickness and composition of the film can be produced in a controlled manner with relative ease.

Another object is to provide convenient methods and techniques which produce continuous magnetic films on surfaces of widely differing geometrical shapes.

In general, the films of the invention each comprise a continuous polycrystalline layer of crystals having a spinel crystal structure and the molar composition $R^{+2}Fe^{+3}{}_2O_4$, where $R^{+2}$ is at least one bivalent metal ion, said film having a thickness between 200 and 10,000 A. and a coercive force between 30 and 600 oersteds.

The films may be prepared by the methods of the invention which comprise preparing an aqueous suspension containing bivalent ions of at least one bivalent metal, wherein at least a major proportion of bivalent metal ion is ferrous ion, and a strong base, such as sodium hydroxide or potassium hydroxide, in an amount such that the molar proportion of hydroxyl ion to bivalent metal ion is less than 2 to 1, and then circulating said suspension in the presence of oxygen into contact with the surface of a substrate which is maintained at a higher temperature than said suspension, preferably by a few degrees centigrade, whereby a continuous film of crystals having a spinel structure forms on said substrate. The spinel crystals are believed to be produced following the oxidation of a portion of ferrous ions in said suspension to ferric ions. The rate at which the film is produced may be controlled by the rate of oxidation of the ferrous ions and by the amount of base added to produce said suspension. A further advantage of the invention is that the methods may be carried out at temperatures and pressures very close to room temperature and pressure.

Figure 4:
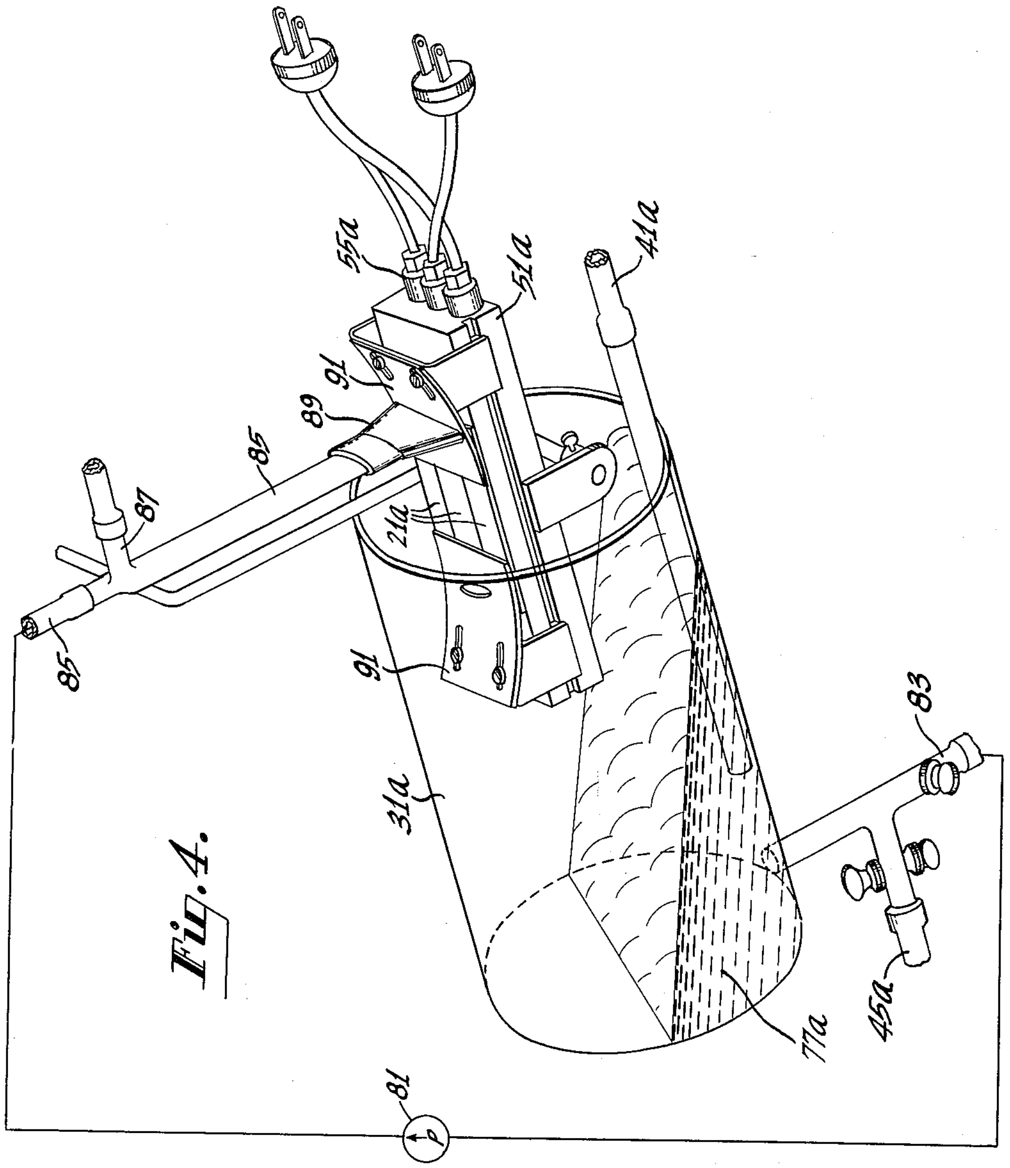

The invention is described in more detail in the following specification and in the drawings in which:

FIGURE 1 is a perspective view of a typical continuous film of the invention upon a support, FIGURE 2 is a partially schematic, elevational view, partially in broken away sections, of an apparatus for carrying out the processes of the invention, FIGURE 3 is a fragmentary view of the portion of the apparatus of FIGURE 2 viewed along section lines 3—3 and, FIGURE 4 is a perspective view of another apparatus for carrying out the processes of the invention.

FIGURE 1 illustrates a typical embodiment of the invention comprising a substrate 21 of glass having a film 23 of magnetite crystals thereon about 2,000 A. thick. The substrate 21 is nonporous and has a smooth surface and may be of any chemically stable material, such as glass; quartz, mica or any other minerals; copper or other metals; polyethylene terephthalate such as Mylar, tetrafluoroethylene polymer such as Teflon or other organic synthetic materials. The film 23 consists essentially of spinel crystals, having the molar composition $R^{+2}Fe^{+3}{}_2O_4$ where $R^{+2}$ is one or more bivalent metal ions. The film 23 may be of a single spinel such as ferrous ferrite (magnetite), or it may be a mixed spinel such as zinc ferrous ferrite, nickel ferrous ferrite, cobalt ferrous ferrite, nickel-cobalt ferrite, or nickel-cobalt-zinc ferrite. The film 23 is further characterized by its thickness in the range between 200 and 10,000 A. but is preferably 1,000 A. to 5,000 A. thick.

The film 23 may be prepared with the apparatus illustrated in FIGURES 2 and 3 which comprises a main tube 31, which is open at its upper end 33, and which has an open port 35 through its side about halfway between its ends. The bottom end 37 of the main tube 31 is closed except for a side arm 39 which branches into two parts: a nitrogen inlet tube 41 and a drain tube 45, each of which is closed by a stopcock 43 and 47 respectively. The main tube 31 is positioned in an inclined position with the port 35 facing upwardly.

The upper end 33 of the main tube 31 is closed by a rubber stopper 49 having two holes extending therethrough. A substrate support assembly 51 extends through one hole of the stopper 49. The substrate support assembly 51 includes a substrate support 53 which is of metal such as copper, for the substratum 21 to be filmed; a substrate heater 55, which extends inside the substrate support 53; and means 57 for connecting the substrate heater 55 to an electric power source (not shown).

A pump assembly 61 extends through the other hole of the stopper 49. The pump assembly 61 comprises an air stopcock 71, an inlet tube 63, which extends through the stopper 49 downwardly within the main tube 31. The inlet tube 63 terminates near the top of a bulb-shaped aerating chamber 65, which chamber is open at the bottom thereof. A chamber outlet tube 67 extends upwardly within the main tube 61 from the chamber 65 to a plurality of nozzles 69 above and closely spaced from the substrate 21 to be filmed. The outlet tube 67 and the nozzles 69 are shown in more detail in the view of FIGURE 3. A tape suspension heater 73 is wrapped around the lower end 37 of the main tube 31. A connection means 75 for connecting the tape heater element 73 to an electric power source (not shown) is also provided.

In operation a suspension 77, as described below, is placed in the main tube 31 and heated by means of the tape heater element 73 to a temperature between 50 and 100° C., preferably about 90° C. The temperature should not be so high as to lose the solvent of the suspension nor so low as to make the rate of reaction impractical. The substrate 21, which is to be filmed is attached to the substrate support 53 and inserted in the main tube 31 so that the substrate 21 is about an inch or so above the level of the suspension 77. The substrate heater 55 is energized, heating the substrate 21 to be filmed. The nitrogen inlet stopper 43 is opened and nitrogen is bubbled in at the bottom of the suspension 77 to provide adequate agitation of the suspension 77.

The air stopcock 71 is now opened and a controlled amount of air is passed into the pump inlet tube 63 which forces the level of the suspension 77 in the chamber 65 down below the pump outlet tube 67. A mixture of air bubbles and suspension 77 rises in the pump outlet tube 67, passes through the nozzles 69 and over the heated substrate 21. In this manner, the suspension 77 is circulated over the surface of the substrate 21 in intimate contact with controlled amounts of oxygen. The air and nitrogen are vented through the port 35. The substrate heater 55 maintains the substrate 21 at a temperature a few degrees higher than the temperature of the suspension 77 circulating thereover.

The rate of flow of the air-suspension mixture over the substrate 21 is controlled by either controlling the rate at which air is passed into the suspension 77 or by the angle at which the main tube 31 is maintained. Different spinels form at different rates and the optimum conditions for different rates are determined empirically for each composition. A continuous film 23 ordinarily forms quickly so that it is visible to the naked eye within a few minutes after the process is started. The time required for forming the continuous film 23 depends upon the composition of the reactants, and to some extent on the temperature of the suspension and of the substrate 21. Thickness of the film 23 attainable depends in part on the composition of the film, but is determined mostly by the length of time that the suspension 77 is circulated over the substrate 21 provided there is an adequate amount of reactant in the suspension 77. The continuous film 23 which has been formed may be built up to greater thicknesses by repeated applications of the suspension 77 using additional fresh suspension, or by cycling a large amount of suspension 77 as by using a reservoir additional to the one described.

*Example 1.*—A ferrous ferrite (magnetite) film may be produced in the apparatus of FIGURE 2 by the following procedure. Dissolve 25 grams of ferrous chloride, $FeCl_2.4H_2O$, in 1700 ml. of water. Dissolve 6 grams of sodium hydroxide, NaOH, separately in 100 ml. of water, and add the sodium hydroxide solution to the ferrous chloride solution to produce a ferrous hydroxide suspension. Approximately ⅙ of the resulting ferrous hydroxide suspension is introduced into the main tube 31. The substrate 21 to be coated is attached to the support 53. The stopper 49, with the assemblies therein, is placed in position in the main tube 31 as shown in FIGURE 2. The substrate heater 53 and the solution heater 73 are energized. The temperature of the suspension 77 in the main tube is raised to about 90° C. The nitrogen stopcock 43 is opened to permit nitrogen gas to bubble slowly through and thereby agitate the suspension 77. The air stopcock 71 is opened to permit air to pass down the inlet tube 63, through the chamber 65, and then to bubble up the outlet tube 67 and out the nozzles 69, thereby pushing an amount of suspension 77 out of the nozzles. The oxygen in the air bubbles reacts with a portion of the ferrous hydroxide in the suspension producing ferric hydroxide which then reacts with another portion of the ferrous hydroxide to form a continuous film of crystals of ferrous ferrite ($Fe_3O_4$) or magnetite on the surface of the substrate 21. The chemical reactions which are believed to take place are as follows:

$$FeCl_2+2NaOH \rightarrow 2NaCl+Fe(OH)_2 \quad (1)$$

$$4Fe(OH)_2+O_2+2H_2O \rightarrow 4Fe(OH)_3 \quad (2)$$

$$Fe(OH)_2+2Fe(OH)_3 \rightarrow Fe_3O_4+4H_2O \quad (3)$$

Reaction (1) is believed to take place when the suspension 77 is produced and also subsequently as the $Fe(OH)_2$ is removed from the suspension. Reactions (2) and (3) are believed to take place as oxygen is taken into the suspension and as the suspension passes over the surface of the support. The process is continued for about 30 minutes and then stopped. The film 23 is estimated to be about 200 A. thick. At the end of this period, the nitrogen and air stopcocks 43 and 71 are closed and the drain stopcock 47 is opened to drain the spent suspension 77 from the main tube 31. The film thickness may be increased by repeating the process using successive portions of the suspension.

*Example 2.*—A nickel ferrous ferrite film may be produced in the apparatus of FIGURE 2 by the following procedure. Dissolve 9.5 grams of nickel chloride, $NiCl_2.6H_2O$, and 15.9 grams of ferrous chloride, $$FeCl_2.4H_2O$$

in 1700 ml. of water. Dissolve 4.8 grams of sodium hydroxide NaOH separately in 100 ml. of water. Mix the two solutions to produce a suspension. Introduce a portion of the suspension into the main tube 31, and then assemble the apparatus as in Example 1. The suspension is brought to a temperature of about 95° C. and the substrate heater 55 is energized. The process is carried on as in Example 1. A film of nickel ferrous ferrite having a spinel crystal structure and estimated to be about 200 A. thick forms in about 30 minutes. The chemical reactions are believed to be similar to those in Example 1 except that nickelous hydroxide is also formed in reaction (1) and is converted with ferrous hydroxide to nickel ferrous ferrite in reaction (3).

*Example 3.*—A nickel-cobalt-zinc ferrite may be produced in the apparatus of FIGURE 2 by the following procedure. Dissolve 6.8 grams of nickelous chloride, $NiCl_2.6H_2O$, 0.3 grams of cobaltous chloride, $$CoCl_2.6H_2O$$

15.9 grams of ferrous chloride, $FeCl_2.4H_2O$, and 1.3 grams of zinc chloride, $ZnCl_2$, in 1700 ml. of water. Dissolve 4.8 grams of sodium hydroxide, NaOH, in 100 ml. of water. The solutions are mixed to produce a suspension. A portion of the suspension is placed in the main tube 31 and heated and processed as described in Example 1. A film of nickel-cobalt-zinc ferrite forms in about 30 minutes. The chemical reactions are similar to those in Example 1 except that nickel, cobalt and zinc ions substitute for a portion of the ferrous ions in reactions (1) and (3).

Tables I and II set forth data of some typical films prepared by the foregoing techniques. Hysteresis loops of the ferrite thin films are measured on a loop tracer at a frequency of approximately 1000 cycles. The glass slides with the films are held in such a way that they can be rotated 360° in their own plane. The test jig contains two drive coils approximately six inches in diameter. The sample is placed between the two coils in a plane perpendicular to the plane of the coils. A pickup coil is parallel to and directly above the sample. Over the pickup coil is a movable balancing coil. The electronics of the instrument are balanced with the sample holder empty. The balancing is helped by adjusting several aluminum compensation blocks mounted on the phenolic frame of the drive coils.

During measurements, the driving field is approximately 14 oersteds at maximum power. The current from the pickup coil is amplified and integrated before being fed to an oscilloscope for observation. The loop squareness and the coercive force are obtained from the oscilloscope trace. In order to observe any anisoptropy in the films, a circular film is prepared and the output measured as the film is rotated in its own plane.

The compositions indicated in Table I are the ones expected on the basis of the starting ratio of reactants and are shown in this way only for the sake of simplicity. Table II reports the data for a series of nickel ferrite films of different thicknesses. Magnetite and nickel ferrous ferrite have been examined by X-ray diffraction and found to have a unit cell with symmetry and size conforming to the literature values for these substances. In the zinc ferrous ferrite series in Table I, there is a marked decrease in coercive force as the Zn content is increased.

X-ray diffraction diagrams were made on material scraped from some of the magnetite film preparations. A single spinel phase was recognized and identified as magnetite ($Fe^{+2}Fe_2^{+3}O_4$) by the presence of the 222 reflection (which is absent for ($Fe_2O_3$)).

By means of a diffractometer (Norelco), utilizing scintilation counting direct X-ray examination was made of a film prepared to be $NiFe_2O_4$. On the basis of only four reflections (113, 400, 333, and 440), a unit cell dimension of 8.37 A. is measured. This is slightly larger than the reported value of 8.36, but can easily be accounted for by a certain amount of $Fe^{++}$ replacing the $Ni^{++2}$.

A few resonance measurements at microwave frequencies have been made. On the basis of these measurements, the thickness of one film was estimated to be 300 to 700 A. Relative thicknesses are estimated by a spectrophotometric technique. Initial measurements indicate that the thickness of most films can be produced in thicknesses between 200 A. to 1000 A.

*Table I*

| Composition: | Coercive force, oersteds |
|---|---|
| $NiFe_2O_4$ | 200 |
| $Fe_3O_4$ | 170 to 300 |
| $Zn_{.10}Fe_{.90}Fe_2O_4$ | 294 |
| $Zn_{.20}Fe_{.80}Fe_2O_4$ | 240 |
| $Zn_{.30}Fe_{.70}Fe_2O_4$ | 193 |
| $Zn_{.40}Fe_{.60}Fe_2O_4$ | 115 |
| $Zn_{.50}Fe_{.50}Fe_2O_4$ | 84 |
| $Zn_{.60}Fe_{.40}Fe_2O_4$ | 50 |
| $Co_{.1}Ni_{.5}Fe_{.4}Fe_2O_4$ | 200 |
| $Ni_{.70}Co_{.05}Zn_{.25}Fe_2O_4$ | 37 |
| $Ni_{.71}Co_{.04}Zn_{.25}Fe_2O_4$ | 29 |
| $Ni_{.72}Co_{.03}Zn_{.25}Fe_2O_4$ | 37 |
| $Ni_{.73}Co_{.02}Zn_{.25}Fe_2O_4$ | 56 |
| $Ni_{.74}Co_{.01}Zn_{.25}Fe_2O_4$ | 38 |

*Table II—Nickel Ferrite*

| Optical absorbance | Coercive force, oersteds | Thickness (Tolansky method), A. |
|---|---|---|
| 1.23 | 224 | ---------- |
| 0.549 | 252 | ---------- |
| 0.390 | 324 | 970 |
| 0.223 | 398 | ---------- |
| 0.128 | ---------- | 560 |
| 0.059 | ---------- | 440 |

The continuous films herein may be prepared by other techniques according to the invention which are similar in principle to the above described processes. A second of these techniques which has been employed comprises preparing the suspension as described above and then circulating the suspension over a substrate by means of an external pump. This second technique has a distinct advantage in that it is more adaptable in the forming of a continuous film on larger areas and on substrates having different geometrical shapes to be filmed.

A perspective view of an apparatus used to carry out this second technique is shown in FIG. 4. A suspension **77*a* in a container 31*a* is heated to a temperature between 50° and 100° C. using a plate heater or tape heater (not shown). Three substrates 21*a* upon which the film 23*a* is to be deposited are clamped to a block heater assembly 51*a* by clamps 91. The block heater assembly 51*a* serves to maintain the temperature of the substrate 21*a* a few degrees higher than that of the suspension 77*a*. Nitrogen is bubbled in at the bottom of the suspension 77*a* through a nitrogen inlet tube 41*a* in order to agitate the suspension 77*a*. A circulating pump 81, shown schematically, pumps the suspension 77*a* through a pump suction tube 83 to a pump discharge tube 85 and out an outlet nozzle 89. An oxygen inlet tube 87 connected to the pump discharge tube 85 near the nozzle 89 permits air or oxygen to be forced into the suspension 77*a* as it passes through. A mixture of suspension and air or oxygen passes over the three abutting substrates 21*a* held to the substrate support 51*a* by clamps 91. The rate of flow of suspension is easily controlled from the pump. The uniformity of flow over the substrate 21*a* may be controlled by changing the width of the opening of the nozzle 89** for the gas-suspension mixture or by adjusting the angle this unit makes with the heater surface, or by changing the rate of flow of the suspension. The film thickness, rate of deposition, etc. are determined in the same way and by the same factors as in the first method described above.

The compositions used in the processes described above may be varied within limits. A soluble ferrous salt is required in all of the starting compositions. Salts of one or more other bivalent metals may also be present. It is preferred that the other bivalent metal ions present have about the same size as a ferrous ion so that they will fit easily into the spinel lattice. Also, it is preferred that the molar proportion of ferrous ions be greater than the molar proportion of all of the other bivalent metal ions combined. Other bivalent metals which may be used are cobalt, zinc, nickel, magnesium, manganese; each may be used singly or in combination with the others. Any soluble salt sof these metals may be used, such as chloride, sulfate, nitrate, and acetate. Sodium hydroxide and potassium hydroxide are the preferred strong bases which may be used for producing the suspension. The molar proportion of sodium and potassium hydroxide to bivalent metal salt should be less than 2 to 1, and preferably about 1 to 1.

There have been described novel continuous magnetic films of spinel crystals and novel methods of preparation thereof.

What is claimed is:

1. A method for preparing a continuous film of crystals having a spinel structure comprising preparing an aqueous suspension containing bivalent ions of at least one bivalent metal, wherein at least a major proportion of said bivalent metal ions are ferrous ions, and a strong base in an amount such that the molar ratio of hydroxyl ions to bivalent metal ions is less than 2 to 1; adjusting the temperature of said suspension to a temperature between about 50° and 100° C., bubbling air through said suspension, and then circulating said suspension into contact with the surface of a smooth, nonporous substrate maintained at a temperature a few degrees centigrade higher than said suspension.

2. The method of claim 1 wherein said aqueous solution includes at least one salt of a bivalent metal other than ferrous.

3. The method of claim 1 wherein said aqueous solution includes at least one salt of a bivalent metal selected from the group consisting of iron, nickel, cobalt, zinc, manganese, and magnesium.

4. A method for preparing a continuous film of crystals having a spinel structure comprising preparing an aqueous suspension containing bivalent ions of at least one bivalent metal, wherein at least a major proportion of said bivalent metal ions are ferrous ions, and a strong base in an amount such that the molar ratio of hydroxyl ions to bivalent metal ions is less than 2 to 1; adjusting the temperature of said suspension to a temperature between about 50° and 100° C., bubbling air through said suspension, and then circulating said suspension into contact with the surface of a smooth, non-porous substrate maintained a a temperature a few degrees centigrade higher than said suspension, stopping said circulation, preparing another aqueous suspension containing bivalent ions of at least one bivalent metal, wherein at least a major proportion of said bivalent metal ions are ferrous ions, and a strong base in an amount such that the molar ratio of hydroxyl ions is less than 2 to 1, adjusting the temperature of said other suspension to a temperature between about 50° and 100° C., bubbling air through said other suspension, and then circulating said other suspension into contact with said surface of said substrate.

5. A method for preparing a continuous magnetic film of crystals having a spinel structure comprising preparing an aqueous solution of a ferrous salt, preparing an aqueous solution of a base selected from the group consisting of sodium hydroxide and potassium sydroxide, mixing amounts of said solutions such that the molar ratio of hydroxyl ion added to ferrous ion added is less than 2 to 1, whereby a suspension is formed, adjusting the temperature of said suspension to between about 50 and 100° C., bubbling air through said suspension, and then circulating said suspension into contact with the surface of a smooth, nonporous substrate maintained at a temperature a few degrees centigrade higher than said suspension.

6. A method for preparing a continuous magnetic film of crystals having a spinel structure upon a substrate comprising preparing an aqueous solution of ferrous chloride, preparing an aqueous solution of sodium hydroxide, mixing amounts of said solutions such that the molar ratio of sodium hydroxide to ferrous chloride is less than 2 to 1 whereby a suspension is formed, adjusting the temperature of said suspension to a temperature of about 90° C., bubbling air through said suspension, and then flowing said suspension over the surface of a smooth, nonporous substrate maintained at a temperature a few degrees centigrade higher than 90° C.

7. A method for preparing a continuous magnetic film of crystals having a spinel structure comprising preparing a first aqueous solution containing a ferrous salt, preparing a second aqueous solution containing at least one bivalent metal salt other than ferrous, preparing a third aqueous solution containing a base selected from the group consisting of sodium hydroxide and potassium hydroxide, mixing amounts of said solutions such that the molar ratio of hydroxyl ion added to ferrous ion added is less than 2 to 1 and the molar ratio of ferrous ion added to other bivalent metal ions added is more than 1 to 1 whereby a suspension is formed, adjusting the temperature of said suspension to a temperature between about 50° and 100° C., bubbling air through said suspension, and then circulating said suspension into contact with the surface of a smooth, nonporous substrate maintained at a temperature a few degrees centigrade higher than said suspension.

8. The method of claim 7 wherein said second solution contains a zinc salt.

9. The method of claim 7 wherein said second solution contains a nickel salt.

10. The method of claim 7 wherein said second solution contains a nickel salt and a cobalt salt.

11. The method of claim 7 wherein said second solution contains a nickel salt, a cobalt salt and a zinc salt.

12. A method for preparing a continuous magnetic film of particles having a spinel structure upon a substrate comprising preparing a first aqueous solution of ferrous chloride, preparing a second aqueous solution of sodium hydroxide, preparing a third aqueous solution containing at least one salt of a bivalent metal selected from the group consisting of nickel, cobalt, zinc, manganese and magnesium, mixing amounts of said solutions such that the molar ratio of hydroxyl ion added to ferrous ion added is less than 2 to 1 and the molar ratio of ferrous ion added to other bivalent metal ions added is more than 1 to 1 whereby a suspension is formed, adjusting the temperature of said suspension to about 90° C., bubbling air through said suspension, and then flowing said mixed solution over the surface of a smooth, nonporous support maintained at a temperature a few degrees centigrade above 90° C.

References Cited in the file of this patent

UNITED STATES PATENTS 2,582,590 Heeren et al. ---------- Jan. 15, 1952
2,996,418 Bleil ---------------- Aug. 15, 1961
3,047,429 Stoller et al. ---------- July 31, 1962
3,075,919 Gruber et al. ---------- Jan. 29, 1963

FOREIGN PATENTS 717,537 Great Britain ---------- Oct. 27, 1954